Patented June 28, 1938

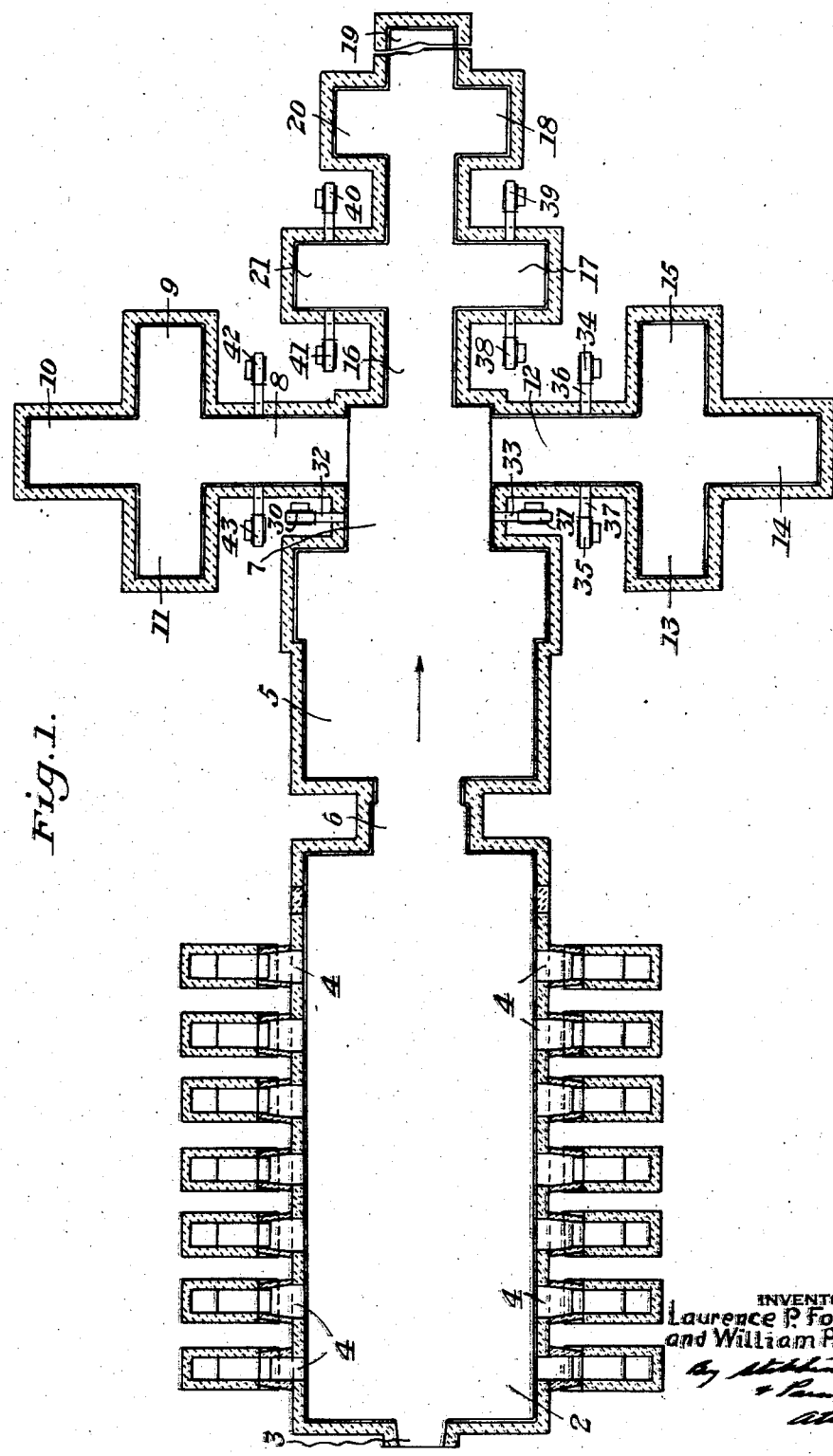

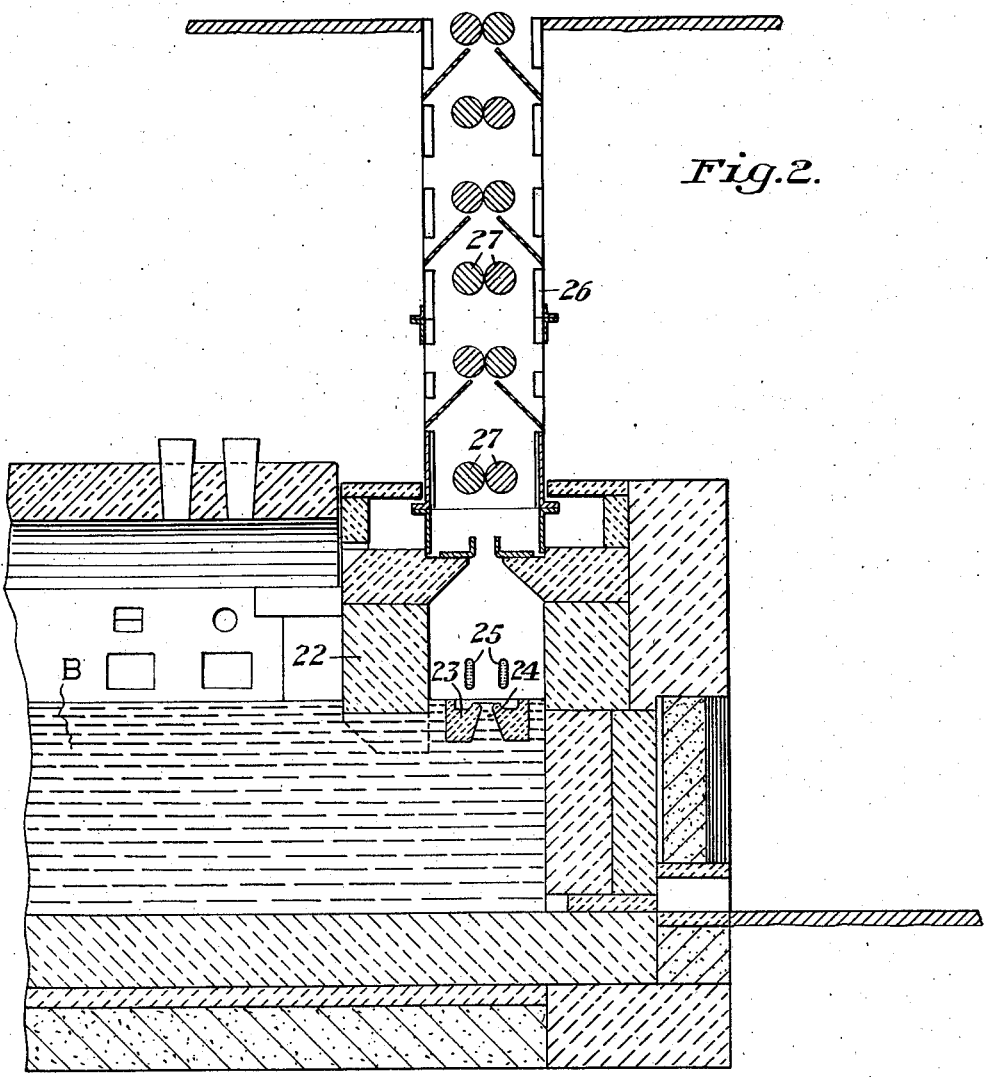

2,121,958

UNITED STATES PATENT OFFICE 2,121,958

MANUFACTURE OF SHEET GLASS

Laurence P. Forman, Oakmont, and William Pancoast, Jeannette, Pa., assignors to American Window Glass Company, Pittsburgh, Pa., a corporation of Pennsylvania Application October 23, 1936, Serial No. 107,192

5 Claims. (Cl. 49—83.1)

The present invention relates to the manufacture of sheet glass and provides a novel method and apparatus effecting material economies and other advantages in the manufacture of sheet glass by continuous drawing from a bath of molten glass.

In the manufacture of sheet glass the batch is fed to a melting furnace through the so-called "dog-house" at one end of the furnace. Gas and air are supplied to the furnace through a plurality of ports extending along the side walls of the furnace. In this way the batch fed to the melting furnace is subjected to very high temperatures to render the glass molten. In the usual installation the molten glass then passes to a furnace extension where it is permitted to cool to some extent. The furnace extension is normally connected to the melting furnace or tank by a restricted neck portion which connects with the melting furnace at the end opposite the end on which the dog-house is located. The molten glass flows through the furnace extension and then passes into canals leading to drawing chambers. These canals are usually connected to the furnace extension at various points and feed a plurality of drawing chambers.

In the Fourcault method of drawing sheet glass a debiteuse is provided in each drawing chamber and this debiteuse is submerged to some extent in the molten glass and the molten glass caused to well up through a centrally disposed opening therein. The glass sheet is continuously drawn through the opening in the debiteuse by means of rollers. In starting the drawing operation of course a bait is used but after the drawing of the sheet has been commenced the sheet is drawn continuously from the bath through the debiteuse. Coolers are provided adjacent the debiteuse for setting the sheet after it has been drawn some slight distance above the debiteuse. Thereafter the sheet progresses upwardly between driving rolls and through a vertically extending lehr at the top of which the glass is cut into appropriate sizes for further handling.

In the Colburn process the sheet of glass is formed continuously from the molten bath of glass in the drawing chamber. In this process the glass sheet is drawn directly from the surface of the molten glass and passes upwardly and is turned over a roller and continues in a horizontally extending direction through a lehr where the glass is permitted to cool and thereafter cut to appropriate size for further handling.

The molten glass as it leaves the melting furnace is at approximately 2500 to 2550° F. The glass cools to some extent during its passage through the furnace extension and as it leaves the furnace extension and passes into the canals leading to the drawing chamber it is ordinarily at approximately 2200 to 2250° F. During its passage through the canals it is ordinarily still at very high temperature. The temperatures in the canals are generally between 2100 and 2200° F., depending upon the location of the canals relative to the furnace extension. These temperatures are too high for drawing purposes and ordinarily it is necessary to provide for some further cooling of the molten glass before it enters the drawing pit. Heretofore it has been the usual practice to provide water cooling pipes immediately behind the bridge wall under which the glass must pass in order to enter the drawing chamber. These water pipes ordinarily extend transversely across the canal and water is continuously circulated therethrough so as to cool the molten glass to approximately 1850 to 1950° F. The use of these cooling pipes extending transversely of the canals back of the bridge walls separating the drawing chambers from the canals has been objectionable. The pipes collect dirt and dust and this accretion built up on the outside of the water cooling pipes renders them less efficient and, in addition, the dirt or dust frequently falls from the cooling pipes into the bath of molten glass and this dirt or dust is carried into the finished product, rendering it defective.

Another difficulty which has heretofore been encountered in the manufacture of sheet glass in the manner above described resides in the fact that the finished product is extremely dirty. At some time during the drawing process a thin film or hum or dirt forms on the glass sheet and it is necessary to remove this film or hum either before shipping the glass or before using it. This ordinarily is done by passing the glass sheets through a cleaning machine of any well-known type. It is believed that this film or hum is caused by products of combustion from the melting furnace passing through the furnace extension and the canals, and being carried by the molten glass under the bridge wall.

One of the principal objections to this method of manufacturing sheet glass, and particularly the Fourcault method where the sheet is drawn through a debiteuse, is that it has been heretofore impossible to appreciably increase the drawing speed. Various expedients have been proposed in order to attempt to increase the drawing speed but none of these attempts have heretofore been successful and, consequently, the speed of drawing has remained at approximately 25 to 30 inches per minute.

By the present invention we have overcome the difficulties above referred to.

In accordance with our invention we propose to blow air into the system between the melting furnace and a drawing chamber. Preferably the air which is blown into the system is at a temperature substantially below the temperatures prevailing in the various canals and in the furnace extension and the air is preferably blown transversely of the direction of flow of the molten glass. We have found that highly advantageous results can be obtained if the air is blown into the system at any one of a plurality of locations between the furnace and the drawing chamber. The air may be blown into the system at the neck portion of the furnace extension, at the furnace extension proper, at the main canals leading to the various drawing pits or at the individual canals immediately behind the bridge walls separating the drawing chambers from the canals.

By blowing the air into the system at any one of the points above referred to, numerous advantages may be obtained. We have found that the cooling pipes which are normally employed adjacent each bridge wall may be entirely eliminated. We have found that the dirty film or hum which formed on the glass sheets may be completely eliminated so that the glass drawn is perfectly clean and need not be subjected to a cleaning operation before shipment. We have also found that the speed of draw may be materially increased. The blowing of the air into the system in the manner above referred to permits the use of higher temperatures in the melting tank thereby increasing the speed of draw. It has not heretofore been possible to utilize higher temperatures in the melting tank in view of the fact that appropriate cooling could not be obtained before the glass reached the drawing chambers and, consequently, the glass would be too hot for proper drawing. Not only does the blowing of air into the system in the manner above described permit the use of higher temperatures in the melting tank, but it results in a shifting of the high temperature zone in the melting furnace appreciably toward the charging end. As will be understood, this gives considerable advantage as it speeds up the rate of melting.

In the accompanying drawings, we have shown for purposes of illustration only apparatus which may be used in carrying out our invention. It will be understood, however, that the installation shown in the drawings is merely a preferred installation and that the air may be blown into the system at the various points above discussed and the advantages of our invention still obtained.

In the drawings,

Figure 1 is a plan view showing the melting furnace, the furnace extension and the arrangement of the canals and drawing pits;

Figure 2 is a vertical sectional view through a portion of a canal leading to a drawing chamber, a drawing chamber and a portion of the vertically extending lehr through which the glass sheet is drawn.

As shown in Figure 1, the batch is fed to the melting furnace 2 through the dog-house 3 which is located at one end of the furnace. Gas and air for combustion are fed to the furnace above the level of the molten glass therein through ports 4 which are spaced along each side wall of the furnace. The batch material is melted in the furnace 2 and in its molten state flows into the furnace extension 5 through the neck 6 of the furnace extension. At the time the glass enters the neck 6 it is normally at a temperature of approximately 2500 to 2550° F.

As the molten glass flows through the furnace extension in the direction indicated by the arrow it is cooled to some extent and normally is at a temperature of approximately 2300° F. as it enters the restricted portion 7 of the furnace extension.

One canal 8 leading to drawing chambers 9, 10 and 11 connects with one side of the restricted end portion of the furnace extension for supplying molten glass from the furnace extension to the drawing chambers. Another similar canal 12 connects with the restricted portion 7 of the furnace extension and is arranged to supply molten glass to the drawing chambers 13, 14 and 15. Another canal 16 connects with the end of the restricted portion of the furnace extension and is adapted to supply molten glass to the drawing chambers 17, 18, 19, 20 and 21.

The depth of the various canals above referred to and of the furnace extension varies somewhat so as to regulate to some extent the rate of cooling so that when the glass reaches the various drawing chambers it will be at the proper temperature for drawing.

As stated above, the temperature of the glass as it enters the furnace extension is approximately 2500 to 2550° F. As it enters the restricted portion of the tank extension, it is ordinarily at a temperature of 2300° F. As it passes through the canals 8 and 12 it is at approximately 2100 to 2200° F. And as the glass enters the canal 16 it is approximately at a temperature of 2200 to 2250° F. As the glass passes through the various canals on its way to the drawing chambers connected thereto it cools appreciably so that the temperature of the bath in each drawing chamber will be approximately 1800° to 1900° F.

As shown in Figure 2 the molten bath B in the various canals in passing to each drawing chamber passes under a bridge wall 22. A debiteuse 23 is located in the drawing chamber and the glass sheet is continuously drawn upwardly through the slot 24 therein. As the glass sheet is drawn upwardly it passes coolers 25 which are adapted to set the glass sheet so that it may continue in sheet form in its upward path. The glass sheet passes up through the drawing chamber and into a lehr 26 between rollers 27 spaced at appropriate intervals upwardly throughout the length of the lehr. Adjacent the top of the lehr the rising glass sheet is scored and broken into appropriate lengths for further handling.

In the installation shown in the drawings, the air is blown into the system at various points. Blowers 30 and 31 are positioned on opposite sides of the restricted portion of the furnace extension and by means of conduits 32 and 33 blow air transversely across the direction of flow of the molten glass. The conduits 32 and 33 are preferably located some distance above the level of the molten glass but these conduits may be positioned at any desirable or convenient height above the normal level of the bath.

The blowers 30 and 31 may be of any desired constructions. They may be ordinary centrifugal blowers or they may be of the so-called "pre-mix" type. Any desired quantity of air may be blown into the furnace extension across the path of the molten glass. We have found that where the conduits 32 and 33 are approximately 6 inches in diameter the quantity of air corresponding to one-half inch on an ordinary water gauge gives highly desirable results.

In the installation shown in the drawings additional blowers 34 and 35 are provided for blowing air transversely across the canal leading to the drawing chambers 13, 14 and 15. These blowers likewise may be of any suitable type and may be adjusted to supply any desirable quantity of air. These blowers and the conduits 36 and 37 connecting them with the canal 12 are likewise located substantially above the level of the glass in the canal.

In the installation shown in the drawings air is also blown into the canals leading to drawing chambers 17 and 21. The blowers 38 and 39 are arranged to blow air transversely across the direction of flow of the glass in its passage to the drawing chamber 17. Similar blowers 40 and 41 are provided for blowing air transversely across the direction of flow of the glass in its passage through the canal into the drawing chamber 21.

Where blowers are provided in the canals adjacent the drawing chambers we have found that it is desirable to place them close to the bridge wall separating the canal and the drawing chamber.

Blowers 42 and 43 are also provided for blowing air across the direction of flow of the molten glass through the canal 8. These blowers are similar to the blowers 34 and 35 in canal 12 and are likewise spaced a substantial distance above the level of the molten glass in the canal.

We have found that by blowing air into the system in the manner above described the advantageous results described above can be obtained. The blowing of the air into the system creates a positive pressure in the area between the melting tank and the drawing chambers and we believe that the creating of this positive pressure prevents the products of combustion from the melting tank 2 from passing through the furnace extension 6 and the various canals and contaminating the glass. In any event, either a sufficient pressure is created in this portion of the system, that is, between the melting tank and the drawing chambers, or a stream of uncontaminated air is provided which is of such character as to prevent the contaminated gases from the melting tank from contaminating the glass passing to the drawing chambers.

We have found that where this transverse circulation of air is effected between the melting furnace and the drawing chamber, the molten glass is cooled to some extent so as to render it unnecessary to use the usual water pipes adjacent the bridge walls of each of the drawing chambers. As is well known, in most installations of this character such water pipes are used to effect a cooling of the molten glass as it passes to the drawing chambers, but we have found that a sufficient cooling action may be effected by the transverse circulation of air between the melting furnace and the various drawing chambers to accomplish the desired cooling. We believe that by blowing air which is at a temperature substantially below that prevailing in the furnace extension or in the various canals a strip or path of relatively cooler glass is formed through which the hot or uncooled glass must flow in its travel to the various drawing chambers.

As stated above, we have found that by blowing air across the path of travel of the molten glass between the melting furnace and a drawing chamber the speed of drawing may be materially increased. The speed of draw has actually been increased in installations of this character from 10 to 20%. The speed of draw may be increased due to the fact that higher temperatures may be maintained in the melting tank and the rate of melting thereby increased without these higher temperatures detrimentally affecting the drawing operation. Not only does the blowing of air across the path of travel of the molten glass between the melting furnace and the drawing chambers permit the use of higher temperatures in the melting tank but it definitely shifts the high temperature zone in the melting tank toward the charging end thereof. This shifting of the high temperature zone is of substantial importance in permitting higher temperatures in the melting tank. We believe that the shifting of the high temperature zone and the consequent permissible use of higher temperatures is occasioned by the fact that a positive pressure is built up in the system between the melting tank and the drawing chamber with the result that the direction of flow of the gases in the system above the level of the molten glass is in the opposite direction to that of the glass, the products of combustion and gases being taken off at the melting furnace. Ordinarily, of course, the products of combustion are taken off from the melting furnace by appropriate conduits so that they will not pass through the balance of the system but we believe that heretofore a substantial quantity of these contaminated products of combustion has passed through the balance of the system. By the practice of our invention this can be prevented.

It is unnecessary that the apparatus for blowing the air into the systems be arranged as shown in the drawings for various arrangements of the drawing equipment can be effected and the advantages of our invention obtained. We have found that advantageous results can be obtained where blowing equipment is provided in the neck portion of the furnace extension which connects it and the melting furnace. We have found also that desirable results can be obtained where provision is made for blowing air transversely across the wider portion of the furnace extension. We have also found that desirable results can be obtained where no air is blown transversely of any portion of the furnace extension but is blown transversely of one or more of the various canals leading to the drawing chambers. We have also found that satisfactory results can be obtained where blowing equipment is provided for blowing air transversely of the individual canals leading to the drawing chambers and positioned adjacent the bridge walls separating the canals and the drawing chambers.

It will be apparent to anyone skilled in this art that the advantages of our invention may be obtained where the air is blown into the system in one or more of the various locations referred to above. It will also be understood by those skilled in the art that various combinations of blowing equipment may be utilized and the advantages of our invention obtained. Consequently we do not intend to be limited in any way to the particular arrangements above described as our invention may be practiced or otherwise embodied within the scope of the appended claims.

We claim:

1. In the method of manufacturing sheet glass wherein the glass is rendered into a molten state in a melting furnace and caused to flow through a channel into a drawing chamber from which the sheet is drawn from the bath of molten glass, the step of blowing a cooling, non-combustible gas into the channel between the melting furnace and the drawing chamber in sufficient quantity to create a pressure in the channel greater than that obtaining within the melting furnace.

2. In the method of manufacturing sheet glass wherein the glass is rendered into a molten state in a melting furnace and caused to flow through a channel into a drawing chamber from which the sheet is drawn from the bath of molten glass, the step of blowing a cooling, non-combustible gas into the channel between the melting furnace and the drawing chamber in sufficient quantity to create a positive pressure therein.

3. In the method of manufacturing sheet glass wherein the glass is rendered into a molten state in a melting furnace and caused to flow through a channel into a drawing chamber from which the sheet is drawn from the bath of molten glass, the step of blowing a cooling, non-combustible gas into the channel between the melting furnace and the drawing chamber across the direction of flow of the molten glass.

4. In the method of manufacturing sheet glass wherein the glass is rendered into a molten state in a melting furnace and caused to flow through a channel into a drawing chamber from which the sheet is drawn from the bath of molten glass, the step of blowing a cooling, non-combustible gas into the channel between the melting furnace and the drawing chamber in a direction substantially normal to the direction of flow of the molten glass.

5. In the method of manufacturing sheet glass wherein the glass is rendered into a molten state in a melting furnace and caused to flow through a channel into a drawing chamber from which the sheet is drawn from the bath of molten glass, the step of blowing a cooling, non-combustible gas having a temperature substantially below that within the channel into the channel and across the direction of flow of the molten glass.

LAURENCE P. FORMAN.
WILLIAM PANCOAST.